US009836479B2

(12) United States Patent
Velummylum et al.

(10) Patent No.: US 9,836,479 B2
(45) Date of Patent: *Dec. 5, 2017

(54) LOCAL STORAGE LINKED TO NETWORKED STORAGE SYSTEM

(71) Applicant: Amazon Technologies, Inc., Seattle, WA (US)

(72) Inventors: Piragash Velummylum, Seattle, WA (US); Johanna S. Olson, Bellevue, WA (US); Korwin J. Smith, Seattle, WA (US); James H. Wood, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/579,213

(22) Filed: Dec. 22, 2014

(65) Prior Publication Data

US 2015/0106412 A1   Apr. 16, 2015

Related U.S. Application Data

(63) Continuation of application No. 13/074,325, filed on Mar. 29, 2011, now Pat. No. 8,924,500.

(51) Int. Cl.
G06F 15/167 (2006.01)
G06F 17/30 (2006.01)
H04L 29/08 (2006.01)

(52) U.S. Cl.
CPC .. *G06F 17/30221* (2013.01); *G06F 17/30126* (2013.01); *H04L 67/1097* (2013.01)

(58) Field of Classification Search
CPC ............... H04L 29/08072; H04L 29/06; H04L 29/08549; H04L 29/08144; G06F 17/30902

See application file for complete search history.

(56) References Cited

U.S. PATENT DOCUMENTS 5,297,148 A   3/1994   Harari et al.
5,635,940 A *   6/1997   Hickman .......... H04L 29/12311
                                    342/357.31

(Continued)

FOREIGN PATENT DOCUMENTS

EP    1942636 A1   7/2008
JP    2007249414   9/2007

(Continued)

OTHER PUBLICATIONS

International Search Report and Written Opinion, dated Jun. 19, 2012 for PCT/US2012/30896.

(Continued)

*Primary Examiner* — Siren Wei
(74) *Attorney, Agent, or Firm* — Thomas | Horstemeyer, LLP

(57) ABSTRACT

Disclosed are various embodiments for storage of files. A removable memory device is configured to couple to a computing device, and a storage management application is stored in the removable memory device, the storage management application being executable by a processor circuit. The storage management application is configured to send a plurality of files for storage in a networked storage system, the networked storage system being remote to the computing device. The storage management system caches a subset of the files on the removable memory device and maintains a local file directory in the removable memory device. The local file directory lists the files stored in the networked storage system in association with an account linked to the removable memory device.

20 Claims, 7 Drawing Sheets

(56) References Cited

U.S. PATENT DOCUMENTS

| | | | |
|---|---|---|---|
| 5,878,218 A * | 3/1999 | Maddalozzo, Jr. | G06F 17/30067 707/999.01 |
| 6,963,914 B1 * | 11/2005 | Breitbart | H04L 67/1095 709/225 |
| 2002/0040405 A1 | 4/2002 | Gold | |
| 2002/0158896 A1 | 10/2002 | Ikeda et al. | |
| 2003/0236950 A1 * | 12/2003 | Clarke | G06F 12/0833 711/144 |
| 2005/0125566 A1 | 6/2005 | Szolyga et al. | |
| 2005/0172279 A1 | 8/2005 | Cook et al. | |
| 2007/0028046 A1 * | 2/2007 | Pham | G06F 13/1668 711/115 |
| 2007/0150481 A1 | 6/2007 | Song et al. | |
| 2008/0005121 A1 * | 1/2008 | Lam | G06F 17/30067 |
| 2008/0168152 A1 * | 7/2008 | Weizman | G06F 17/30126 709/213 |
| 2009/0019223 A1 | 1/2009 | Lection et al. | |
| 2009/0019288 A1 | 1/2009 | Oom Temudo de Castro et al. | |
| 2009/0204647 A1 * | 8/2009 | Bentley | G06F 17/3023 |
| 2010/0082764 A1 * | 4/2010 | Davis et al. | 709/213 |
| 2010/0332818 A1 | 12/2010 | Prahlad et al. | |
| 2011/0040812 A1 | 2/2011 | Phillips | |
| 2011/0252071 A1 * | 10/2011 | Cidon | G06F 17/30174 707/802 |
| 2014/0032760 A1 * | 1/2014 | Cohen | G06F 9/5011 709/226 |

FOREIGN PATENT DOCUMENTS

| | | |
|---|---|---|
| JP | 2011501317 | 1/2011 |
| WO | 2008005765 | 4/2008 |

OTHER PUBLICATIONS

Written Opinion, dated Jan. 15, 2015 for 201306688-1.
Extended European Search Report for EP 12762933.5—1952 / 2691868 PCT/US2012/030896 dated Jun. 8, 2015.
CN Office Action for CN 201280016908.0 dated Aug. 31, 2016.
Canadian Patent Application CA2,829,221 filed on Mar. 28, 2012, Office Action dated Feb. 26, 2016.
Canadian Patent Application CA2,829,221 filed on Mar. 28, 2012, Office Action dated Mar. 6, 2015.
Chinese Patent Application CN201280016908.0 filed on Mar. 28, 2012, Office Action dated Jan. 14, 2016.
Japanese Patent Application JP2014-502741 filed on Mar. 28, 2012, Notice of Reasons Rejection dated Aug. 21, 2015.
Japanese Patent Application JP2014-502741 filed on Mar. 28, 2012, Notice of Reasons Rejection dated Oct. 24, 2014.
Singapore Patent Application SG201306688-1 filed on Mar. 28, 2012, Intent to Grant/Final Examination Report dated Oct. 20, 2015.

* cited by examiner

LOCAL STORAGE LINKED TO NETWORKED STORAGE SYSTEM

CROSS-REFERENCE TO RELATED APPLICATIONS

This application is a continuation of and claims the benefit of U.S. patent application Ser. No. 13/074,325, entitled "LOCAL STORAGE LINKED TO NETWORKED STORAGE SYSTEM," and filed Mar. 29, 2011, which is hereby incorporated by reference in its entirety.

BACKGROUND

Users may wish to store data with networked storage systems that provide storage guarantees to ensure that data is safe from fires and other hazards. Unfortunately, it can be difficult for some users to interact with networked storage systems due to lack of computing skills and other problems.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Various embodiments of the present disclosure relate to remote storage of data files according to a utility computing model. A networked file system may be employed to provide access to files stored in a cloud computing resource comprising a networked plurality of computing devices. In some embodiments, the networked file system may correspond to a virtual file system where the actual data objects of the files are stored in a separate data storage system. A metadata service may be used to associate metadata with the files, thereby facilitating searches of the files using the metadata. By storing files in such a networked file system, users may access the files from any computing device that has network connectivity.

According to various embodiments, a portable memory device is used to provide remote storage in a networked storage system for a client device. The portable memory device may comprise a memory stick or other device with like capability. When a client stores a file to the portable memory device, the file is ultimately stored in the networked storage system which may comprise a cloud storage system, where a listing of the files stored in the networked storage system is maintained in the portable memory device. A subset of the files stored in the networked storage system that have been most recently accessed may also be stored in the portable memory device. An application may be executed in association with the portable memory device that serves to manage the storage of files on both the portable memory device and in the networked storage system. In addition, other functionality is discussed with respect to other embodiments. In the following discussion, first a description of the physical nature of the various components is provided, followed by a discussion of the operation of the same.

Figure 1:
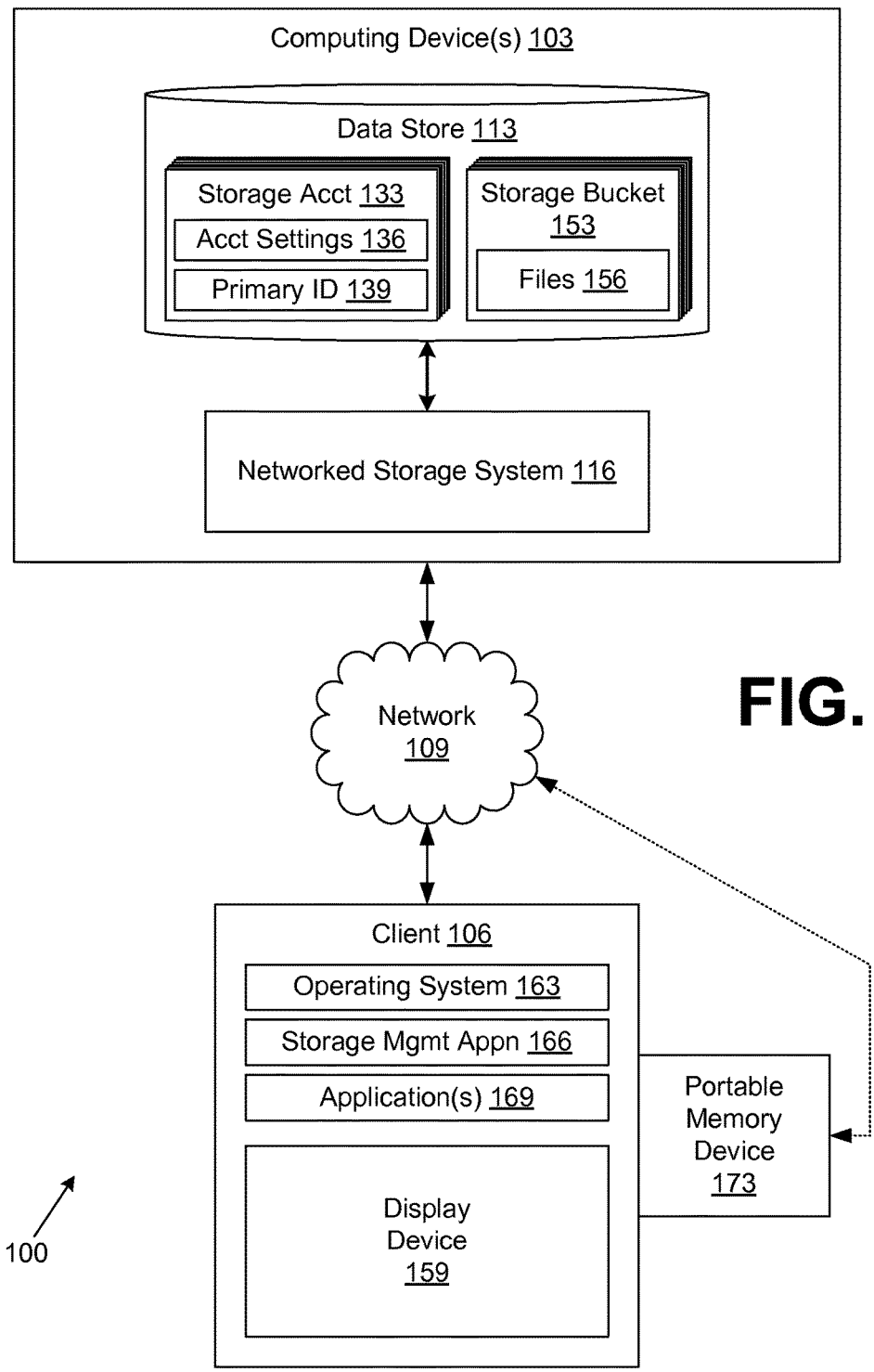
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores 113 as can be appreciated. The data stored in the data store 113, for example, is associated with the operation of the various applications and/or functional entities described below.

The components executed on the computing device 103, for example, include a networked storage system 116 and other applications, services, processes, systems, engines, or functionality not discussed in detail herein. The networked storage system 116 is executed to maintain a file hierarchy of files and folders in networked or metadata-based file systems for users. To this end, the networked storage system 116 may support various file-related operations such as, for example, creating files, deleting files, modifying files, setting permissions for files, downloading files, and/or other operations.

A metadata service may be executed in association with or as part of the networked storage system 116 to maintain metadata items in association with files. To this end, such a metadata service may support various operations such as, for example, creating metadata items, deleting metadata items, retrieving metadata items, searching on metadata items, and/or other operations. The metadata service may also implement one or more searchable indices of the metadata items.

Various applications may be provided that correspond to hosted applications that may access the data stored in the networked file system. Such applications may, for example, have a web-based interface and may serve up network pages, such as web pages or other forms of network content, to facilitate user interaction. Other applications may be internal applications and may not have a web-based interface. Non-limiting examples of such applications may include a photo organizing tool, a music file organizer and playback tool, a word processor, a spreadsheet, an email application, and so on.

The data stored in the data store 113 includes, for example, storage accounts 133. Associated with each storage account 133 are account settings 136, a primary identifier 139, and potentially other information. The primary identifier 139 may comprise, for example, an email address, a string of characters, or other type of identifier as will be described. Associated with each storage account 133 are one or more storage buckets 153 in which various files 156 are stored on the behalf of the user who holds the storage account 133 as will be described.

The storage account 133 may include information about a user with which the storage account 133 is associated. Such information may comprise, for example, name, address, payment instruments, and other information. The account settings 136 may be employed to specify and track various settings and other functionality with respect to a given storage account 133 such as passwords, security credentials, file management permissions, storage quotas and limitations, authorized access applications, billing information, and/or other data. The primary identifier 139 is an identifier associated with the holder of the respective storage account 133. Such a user may be deemed the primary holder of the account and can control its usage.

The client 106 is representative of a plurality of client devices that may be coupled to the network 109. The client 106 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability. The client 106 may include a display device 159 such as a liquid crystal display (LCD), or other type of display device as can be appreciated.

The client 106 may be configured to execute and operating system 163, a storage management application 166, and other applications 169 such as an email application, instant message applications, a browser, word processors, spreadsheets, drawing applications, and/or other applications.

A portable memory device 173 is in data communication with the client 106. In one example, the portable memory device 173 may be coupled to the client 106 through an appropriate interface such as a Universal Serial Bus (USB) connector or other interface. In one embodiment, the portable memory device 173 may comprise a memory stick or similar device.

Alternatively, wireless communication may be established between the portable memory device 173 and the client 106 by way of an appropriate wireless standard/protocol such as BlueTooth™ or other appropriate standard/protocol.

In the following discussion, a general description of the system and its components is provided, followed by a discussion of the operation of the same.

The storage management application 166 executed on the client 106 in association with the portable memory device 173 coupled to, or otherwise in data communication with, the client 106 provides for storage of files 156 by the networked storage system 116 on the computing device 103. At the same time, from the client 106 perspective the storage of such files 156 appears to be local to the client 106 on the portable memory device 173. To this end, the storage management application 166 comprises an application executed in the client 106 that promotes a perception that the portable memory device 173 provides for local storage of files 156. This is the case although storage for the files 156 actually is provided by the networked storage system 116 that is accessible to the client 106 through the network 109.

In this respect, the portable memory device 173 is employed for intermediate storage of a subset of the files 156 stored by the networked storage system 116. Specifically, in one embodiment, the storage management application 166 stands between the portable memory device 173 and the operating system 163 of the client 106. When the storage management application 166 is first installed in the client 106, it manipulates settings within the operating system 163 so that the operating system 163 is led to perceive the portable memory device 173 as a local storage device when all files stored thereon are in fact stored remotely by the networked storage system 116. Alternatively, the storage management application 166 may be configured to run directly from the portable memory device 173 and may not be installed in the client 106. In this embodiment, the storage management application 166 may be installed each time the portable memory device 173 is coupled to, or otherwise first brought into data communication with, the client 106.

In one embodiment, the storage management application 166 is configured to store only the most recently accessed files in a local cache on the portable memory device 173. To this end, a subset of the files 156 stored by the networked storage system 116 are also stored on the portable memory device 173, where the subset comprises the most recently accessed files. Alternatively, the files that are stored or cached on the portable memory device 173 may be selected based on other criteria.

When the operating system 163 or other application attempts to store a file to the portable memory device 173, the storage management application 166 acts as the receiving point for the portable memory device 173 and causes the file to be stored on the portable memory device 173 as a most recently accessed file unless the file is already stored on the portable memory device 173. If there is not enough room to store the file on the portable memory device 173, then the storage management application 166 may delete the earliest saved files on the portable memory device 173 to make room for the newest file.

In addition, the storage management application 166 sends the file that is to be stored to the networked storage system 116 over the network 109. The networked storage system 116 then stores the file in an appropriate storage bucket 153 as one of the files 156, where the respective storage bucket 153 is associated with the storage account 133 of the user who operates the client 106.

In addition, the storage management application 166 maintains a local file directory in the portable memory device 173 of all of the files 156 stored by the networked storage system 116. Some of those files may be located in the portable memory device 173 if they were most recently accessed or based on some other criteria mentioned above. By maintaining the local file directory on the portable memory device 173, applications 169 within the client 106 may be made aware of all of the files 156 that are accessible through the portable memory device 173 and the networked storage system 116.

However, given the operation of the storage management application 166, no application perceives such files 156 as being stored remotely by the networked storage system 116 as described above. If a given application 169 requests a specific file 156, the storage management application 166 will first identify whether such file is stored locally in the portable memory device 173 as one of the subset of files stored therein. If so, then the storage management application 166 provides the requesting application 169 the file from the portable memory device 173.

However, if the requested file is not stored in the portable memory device 173, then the storage management application 166 sends a request to the networked storage system 116 for the respective file 156 in association with the storage account 133 of the user. The networked storage system 116 then responds by accessing and sending the respective file 156 back to the storage management application 166. Upon receipt of the file, the storage management application 166 provides the file to the requesting application 169 and also stores the requested file 156 on the portable memory device 173.

If there is not enough memory space in the portable memory device 173 for local storage of the file, then one or more of the earliest stored files on the portable memory device 173 may be deleted to make further memory space. Deletion of such locally stored files is of no great consequence since such files are also stored in a storage bucket 153 by the networked storage system 116 and are still accessible in the similar manner described above. Thus, the storage management application 166 executed in the client 106 provides for access to the files from the remote computing device 103 or from the portable memory device 173 coupled to the client 106.

When a file has been accessed by the storage management application 166 either from the portable memory device 173 or through the networked storage system 116, the local file directory within the portable memory device 173 is updated to indicate the latest time of access and to update any other parameters stored in association with the file.

Assuming that a user wishes to store a file through the portable memory device 173 in the networked storage system 116, then a respective application 169 may provide a write request to the storage management application 166. In response, the storage management application 166 first determines whether there is room in the portable memory device 173 to store the file locally. If so, then the file is stored on the portable memory device 173 and the local file directory is updated with the name of the file. If the same file has previously been stored, then the local file directory is updated to indicate the time of storage, etc. If the version of the file stored locally is obsolete with respect to the version to be stored, then the new version may be stored in the portable memory device 173 in place of the old version.

In addition, the storage management application 166 sends the file to the networked storage system 116 for storage as one of the files 156 in a respective storage bucket 153 associated with a storage account 133 of a user. In this respect, the user can store files in a cloud storage system or other remote storage system through the networked storage system 116 while maintaining an appearance within the local client 106 that such storage of the files is local to the client.

In addition, there may be other functionality associated with the storage of files 156 through the portable memory device 173 as will be described below.

It should be understood that from time to time the network connection of the client 106 to the network 109 may not be available. In situations where a file is to be sent to the computing device 103 from a client 106 by the storage management application 166 and the network connection of the client 106 is not available for some reason, the storage management application 166 may flag the respective file stored in the portable memory device 173 for future storage in the networked storage system 116 when the network connection becomes available in the future. Also, if the storage management application 166 wishes to access or load a file from the networked storage system 116 and the network connection is not available, first the storage management application 166 will examine the portable memory device 173 to determine whether the file is stored locally. If not, then given that the network connection is not available, the storage management application 166 may reply to the requesting processor application that the file is not available.

In an alternative embodiment, the portable memory device 173 may include a network connection to the network 109 and therefore to the networked storage system 116. For example, the portable memory device 173 may include a wireless capability or other type of data connection to the network 109. In such case, the storage management application 166 may be executed within a processor circuit in the portable memory device 173, where the network connection of the client 106 to the network 109 is bypassed entirely.

Figure 2:
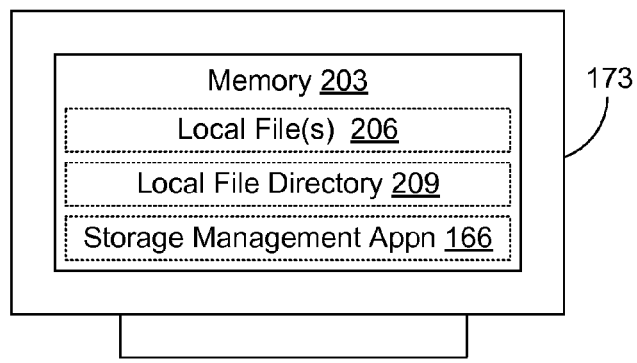
FIG. 2 is a drawing of one example of a portable memory device that is pluggable into a client device in the networked environment of FIG. 1 according to various embodiments of the present disclosure.

With reference to FIG. 2, shown is one example of the portable memory device 173 according to various embodiments. The portable memory device 173 includes a memory 203 that may comprise, for example, solid state memory devices or other types of memory as can be appreciated. Stored within the memory 203 is a subset of local files 206 as described above. In addition, stored in the memory 203 is the local file directory 209. The local file directory 209 includes the listing of all of the files 156 (FIG. 1) stored by the networked storage system 116 (FIG. 1). A subset of such files 156 may be stored as local files 206 on the memory 203 as described above. When an application 169 (FIG. 1) accesses the portable memory device 173 to obtain a listing of the available files to open, etc., the listing of files in the local file directory 209 may be provided.

In addition, the local file directory 209 may include data from the headers of the files 156 or portions of those files 156 that may be useful in listing the files 156 for access by a user. For example, when a file 156 is a song in MP3 format, a portion of the song may be stored in the local file directory 209 to play for a user to determine whether they wish to access the song. Alternatively, other information such as metadata, thumbnails of images, and other data may be included in the local file directory 209. In one embodiment, flags or other values may be associated with each file listing in the local file directory 209 that indicates whether the file is stored locally in the portable memory device 173, the networked storage system 116, or both. When the listing of the files from the local file directory 209 is presented for a user to select a file to access, an indication as to whether the file is stored in the portable memory device 173, the networked storage system 116, or both may be displayed in association with each file. Such an indication may comprise various symbols, text indications, or other indications.

In addition, a copy of the storage management application 166 may be stored in the portable memory device 173. In one embodiment, the storage management application 166 is installed into the client 106 when the portable memory device 173 is first coupled to the client 106, or at least when data communication is first established between the portable memory device 173 and the client 106. To this end, the portable memory device 173 may include an appropriate executable that may be accessed by the processor circuit of a client 106 in order to install the storage management application 166 as mentioned above. Such installation may be performed manually or automatically.

Figure 3:
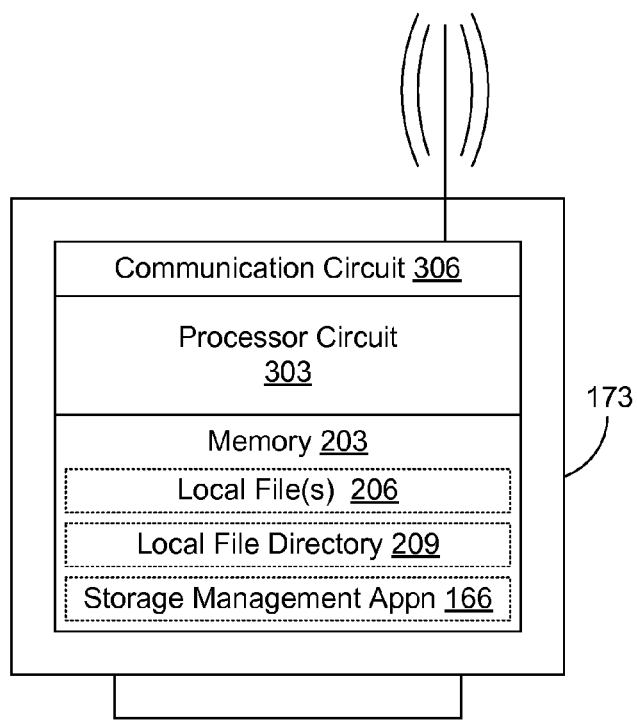
FIG. 3 is a drawing of another example of a portable memory device that is pluggable into a client device in the networked environment of FIG. 1 according to various embodiments of the present disclosure.

With reference to FIG. 3, shown is another embodiment of the portable memory device 173 in which the portable memory device 173 includes a processor circuit 303 and a communication circuit 306. A processor circuit 303 is employed to execute the storage management application 166 as described above, and the communication circuit 306 is employed to establish communication with a networked storage system 116 (FIG. 1) through an appropriate network 109 (FIG. 1). According to one embodiment, the communication circuit 306 may provide for wireless communication with appropriate elements in the network 109 so that direct communication between the processor circuit 303 and the networked storage system 116 may be established without the need to access the network 109 through the client 106. In addition, it is possible that the execution of the storage management application 166 may be accomplished partially by the processor circuit 303 and partially by the processor circuit of the client 106.

Referring next to FIGS. 4A, 4B, 4C, and 4D, shown is a flowchart that provides one example of the operation of a portion of the storage management application 166 according to various embodiments. It is understood that the flowchart of FIGS. 4A, 4B, 4C, and 4D provides merely an example of the many different types of functional arrangements that may be employed to implement the operation of the portion of the storage management application 166 as described herein. As an alternative, the flowchart of FIGS. 4A, 4B, 4C, and 4D may be viewed as depicting an example of steps of a method implemented in the client computing device 106 (FIG. 1) according to one or more embodiments.

Beginning with box 403, the storage management application 166 is run within the client 106 or the portable memory device 173 (FIG. 1) as described above. In the case that the storage management application 166 is executed on the client 106, then the storage management application 166 may interact with the operating system 163 (FIG. 1) to simulate a local storage device for the portable memory device 173 by setting and/or overwriting any parameters or settings in taking any action necessary so that the client 106 perceives the portable memory device 173 to be a local storage device without any actual knowledge that the files stored in the portable memory device 173 are in fact stored in the networked storage system 116.

Various parameters that need to be set may include, for example, a maximum amount of storage available in a respective storage bucket 153 for the storage account 133 of a user and other parameters as can be appreciated. Also, the parameters may include a percentage of the storage available in a respective storage bucket 153 at any given time. Thereafter, in box 406, the storage management application 166 determines whether a respective application 169 (FIG. 1) has provided a read request that a certain file 156 (FIG. 1) is to be loaded into random access memory of the client 106 for execution or to otherwise be accessed. For example, such a file may comprise an executable file or a data file such as a Word processor document, spreadsheet, or other such document as can be appreciated. In order for such an application 169 to identify the file that is to be accessed, the local file directory 209 (FIGS. 2 and 3) may be consulted to provide a user with a listing of files that can be accessed. The user may select one of these files, thereby essentially generating the read request associated with box 406.

Assuming that a file is to be loaded as determined in box 406, then the storage management application 166 proceeds to connector A as shown. Otherwise, the storage management application 166 progresses to box 409 to determine whether an application 169 has requested to write a file to the portable memory device 173, and therefore, to the networked storage system 116. If so, then the storage management application 166 progresses to connector B. Otherwise, the storage management application 166 moves to box 413.

In box 413 it is determined whether there are any tagged files stored in the portable memory device 173 that have yet to be stored in the networked storage system 116 due to unavailability of a network connection of the client 106 or a network connection of the portable memory device 173 as described above. If tagged files exist, then the storage management application progresses to box 416 to determine whether the networked storage system 116 is available as can be ascertained by virtue of whether the network connection is active. If so, then the storage management application progresses to connector C. Otherwise, the storage management application 166 moves to box 419 as shown.

In box 419, it is determined whether a given application 169 has requested that a file 156 is to be deleted. If such is the case, then storage management application 166 progresses to connector D as shown. Otherwise, the storage management application 166 reverts back to box 406 as shown.

In addition, it should be understood that there may be other functions performed with respect to the storage of files in the networked storage system 116 and on the local memory of the portable memory device 173, where those described above and in the text that follows are merely examples.

Figure 4A:
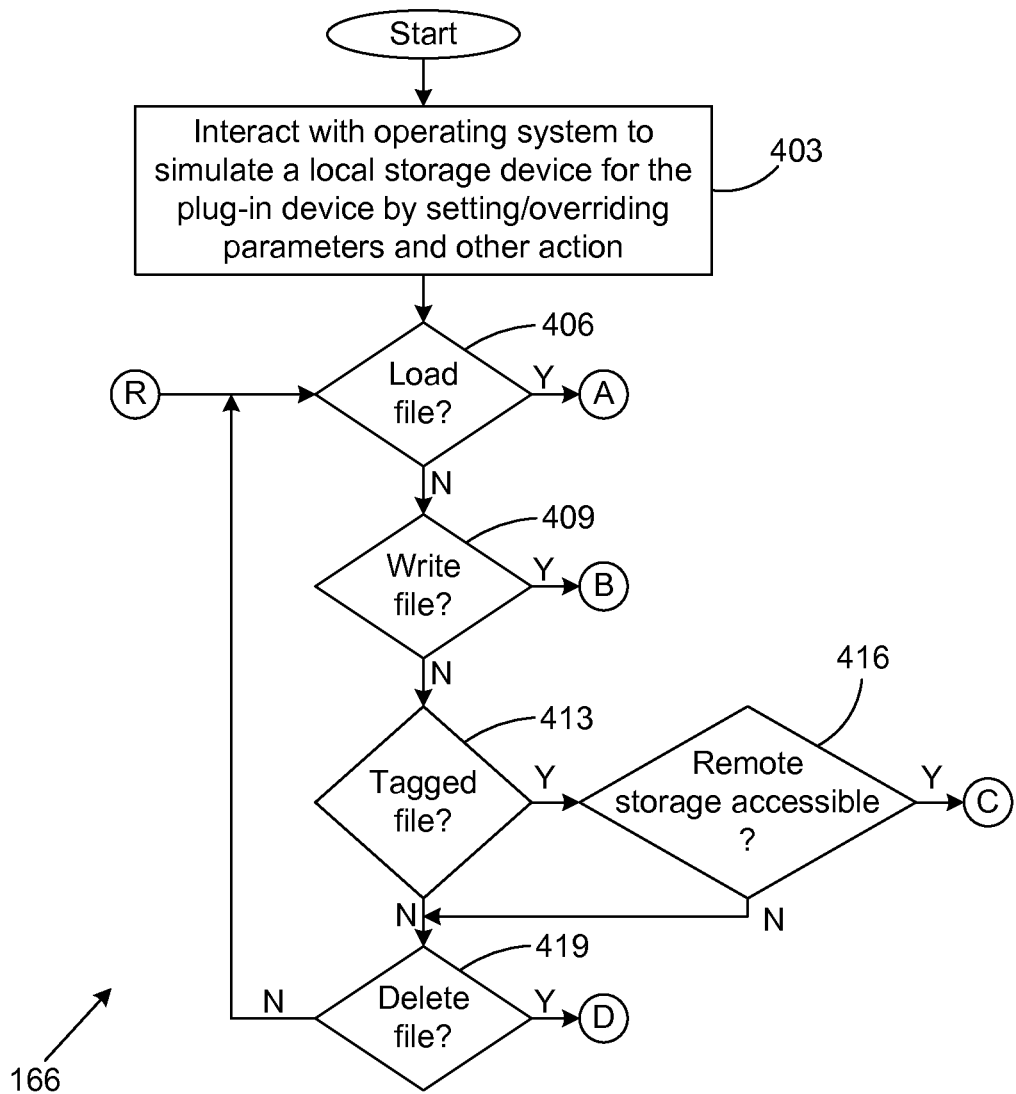
FIGS. 4A-D illustrate a flowchart that provides one example of functionality implemented as portions of a storage management application executed in a computing device in the networked environment of FIG. 1 according to various embodiments of the present disclosure.
Figure 4B:
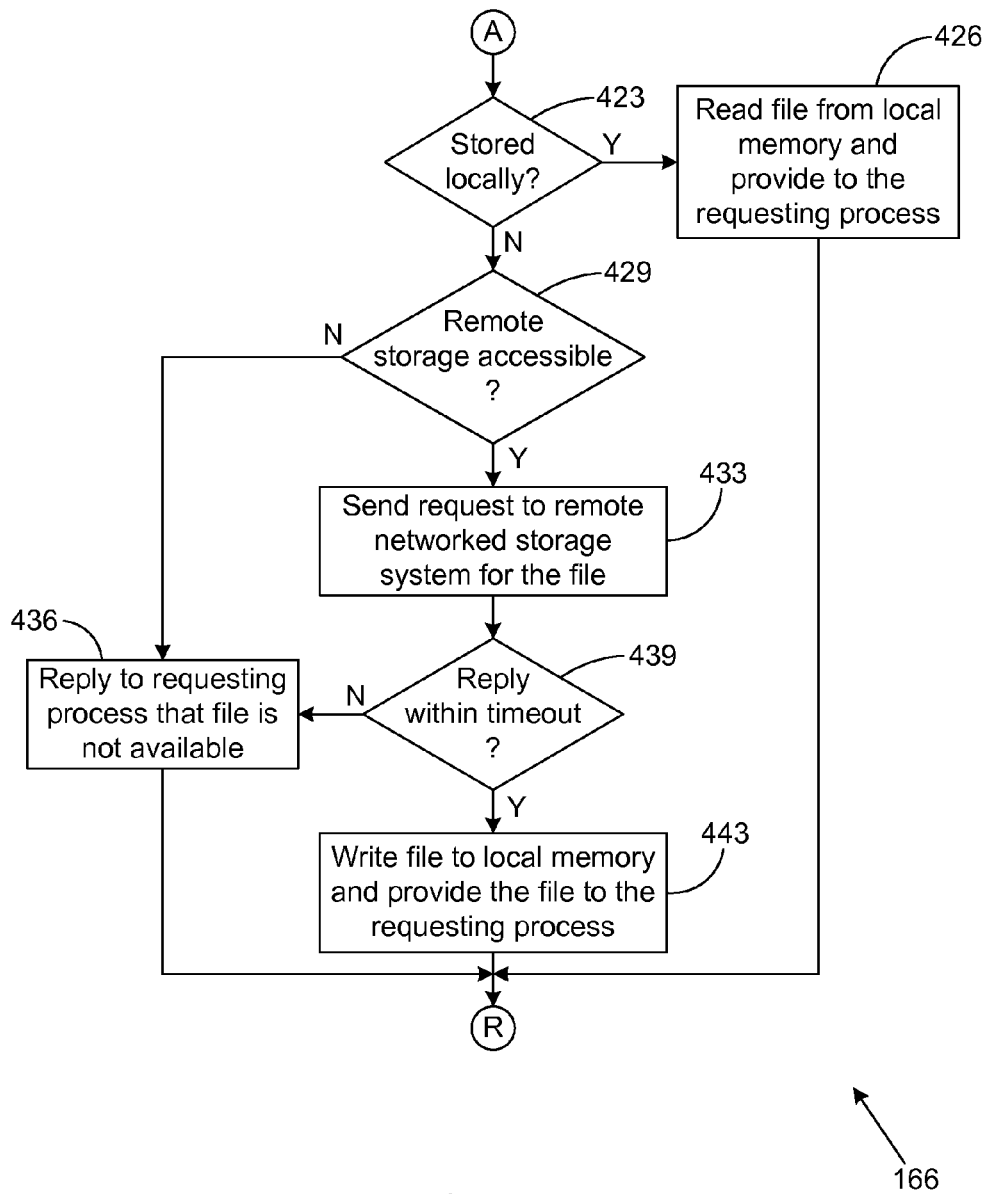

With reference next to FIG. 4B, shown is a portion of the storage management application 166 that is executed when there is an indication that a file is to be loaded into local access memory of the client 106 as described above. Beginning from connector A, the storage management application 166 progresses to box 423 to determine whether the requested file is stored locally as one of the files 206 (FIGS. 2, 3). If so, then in box 426 the file may be read from the local memory in the portable memory device 173 and provided to the requesting process. Thereafter, the storage management application 166 progresses to connector R that leads back to box 406 (FIG. 4A) as shown.

However, if the file is not stored locally as one of the files 206, then the storage management application 166 proceeds to box 429 to determine whether the networked storage system 116 is available by virtue of the fact of whether a network connection is active either through the client 106 or through the portable memory device 173 through the communication circuit 306 (FIG. 3) as described above. If the networked storage system 116 is available, then the storage management application 166 proceeds to box 433. Otherwise, the storage management application 166 progresses to box 436.

In box 433, the storage management application 166 sends a request to the networked storage system 116 for the requested file. Thereafter, the storage management application 166 waits in box 439 for a reply from the networked storage system 116 that includes the requested file. If no reply is received within a predefined timeout or if a reply is received indicating an error that does not include the file, then the storage management application 166 reverts to box 436. In box 436, the storage management application 166 sends a reply to the requesting process that the file is not available. Thereafter, the storage management application 166 progresses to connector R as shown.

Assuming that a reply was received within the timeout period that included the requested file in box 439, then the storage management application 166 progresses to box 443 to write the file to the local memory within the portable memory device 173 and to provide the file to the requesting process. The files are also written to the local memory 203 of the respective portable memory device 173 given that it has been most recently accessed as described above. In the case that there is not enough room to write the file to the local memory 203, then the earliest stored files in the local memory 203 may be deleted to make room for storage of the latest accessed files. Thereafter, the storage management application 166 progresses to connector R as shown.

Figure 4C:
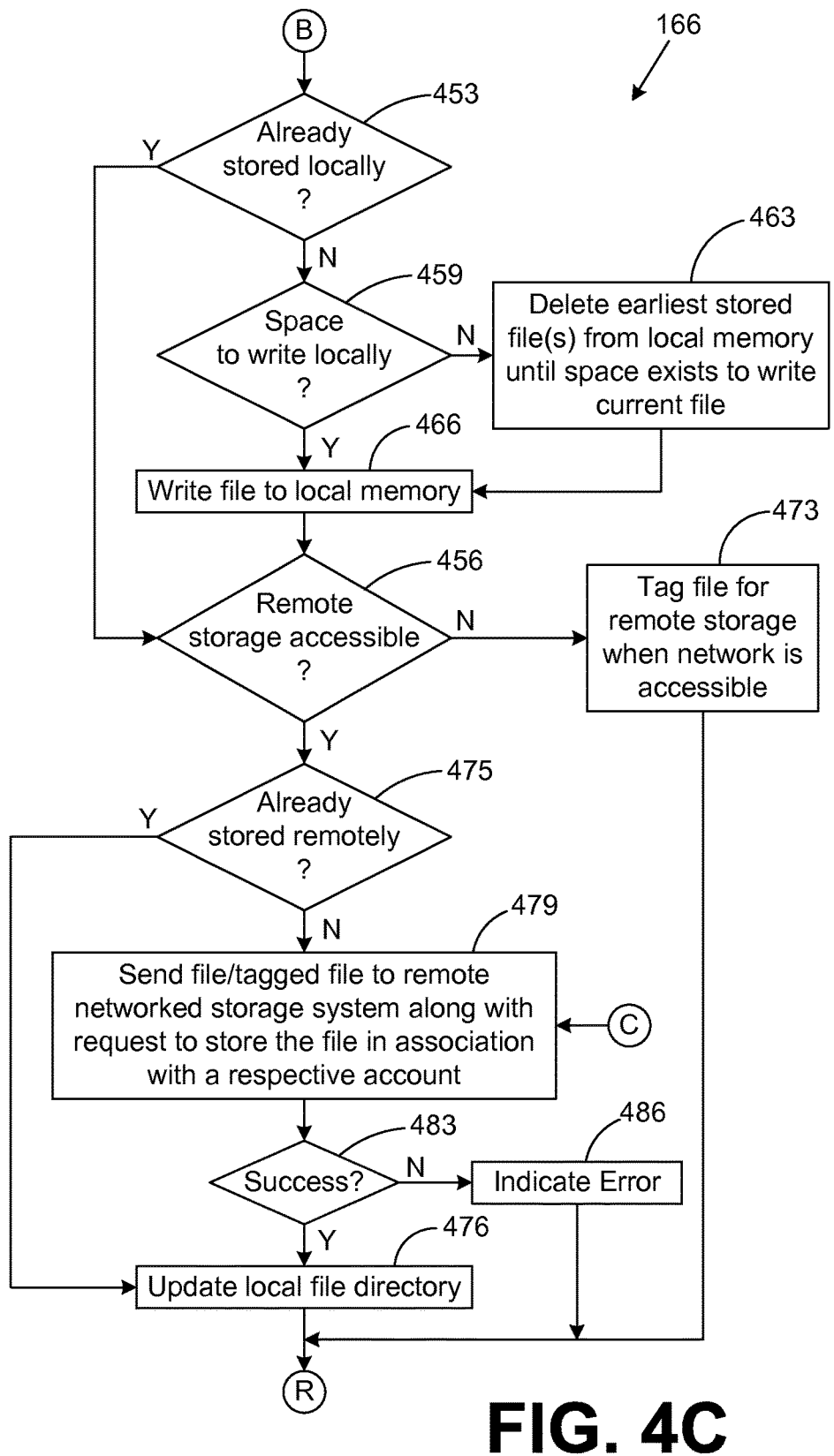

With reference to FIG. 4C, shown is a portion of a functionality of the storage management application 166 that is implemented when it is determined that a file is to be written to the portable memory device 173 and the networked storage system 116 as described above.

Beginning with box 453, the storage management application 166 determines whether the file that is to be written to the portable memory device 173 and the networked storage system 116 is already stored locally in the memory 203 (FIGS. 2, 3) of the portable memory device 173. This would not be the case if the file was changed relative to a prior stored version, or if the file was never previously stored. If such is the case, then the storage management application 166 progresses to box 456. Otherwise, the storage management application 166 moves to box 459.

In box 459, the storage management application 166 determines whether there is memory space to write the current file to be stored in the memory 203 associated with the portable memory device 173. If not, then the storage management application 166 progresses to box 463 and deletes the earliest stored files from the local memory 203 until space exists to write the current file. Thereafter, the storage management application 166 progresses to box 466.

Assuming that there is space to write the file in the local memory 203 as determined in box 459, then the storage management application 166 also proceeds to box 466 in which the file is written to the local memory 203. Thereafter, the storage management application 166 progresses to box 456.

In box 456, it is determined whether the network access is available to allow the storage management application 166 to communicate with the networked storage system 116. If not, then in box 473, the file to be written to the memory is tagged in the local memory 203 for remote storage when the network access becomes available. Thereafter, the storage management application 166 proceeds to connector R.

However, if remote storage is accessible as determined in box 456, then the storage management application 166 progresses to box 475. In box 475, it is determined whether the file to be stored has already been stored in the networked storage system 116. This would not be the case if the file was changed relative to a prior stored version, or if the file was never previously stored. If so, then the storage management application 166 progresses to box 476. Otherwise, the storage management application 166 moves to box 479.

In box 476, the storage management application 166 updates the local file directory 209 (FIGS. 2, 3) to indicate the latest time at which an attempt was made to store the file. Thereafter the storage management application 166 proceeds to connector R.

Referring back to box 479, the storage management application 166 sends the file or tagged file to the networked storage system 116 through the respective network connection along with a request to store the file in association with the storage account 133 of the respective user. Thereafter, in box 483, the storage management application 166 determines whether the storage of the file by the networked storage system 116 was successful. This may be determined, for example, by waiting to receive an acknowledgement from the networked storage system 116 that indicates that the storage was successful. Assuming that a timeout occurs or that the storage was not successful in box 483, then in box 486, the storage management application 166 may log an error for the storage of the file and may also output a storage error to a user as is appropriate. Thereafter, the storage management application 166 proceeds to connector R as shown.

However, if the storage of the file by the networked storage system 116 was successful as determined in box 483, then the storage management application 166 progresses to box 476 to update the local file directory 209 to indicate the files stored by the networked storage system 116. Thereafter the storage management application 166 progresses to connector R as shown.

Figure 4D:
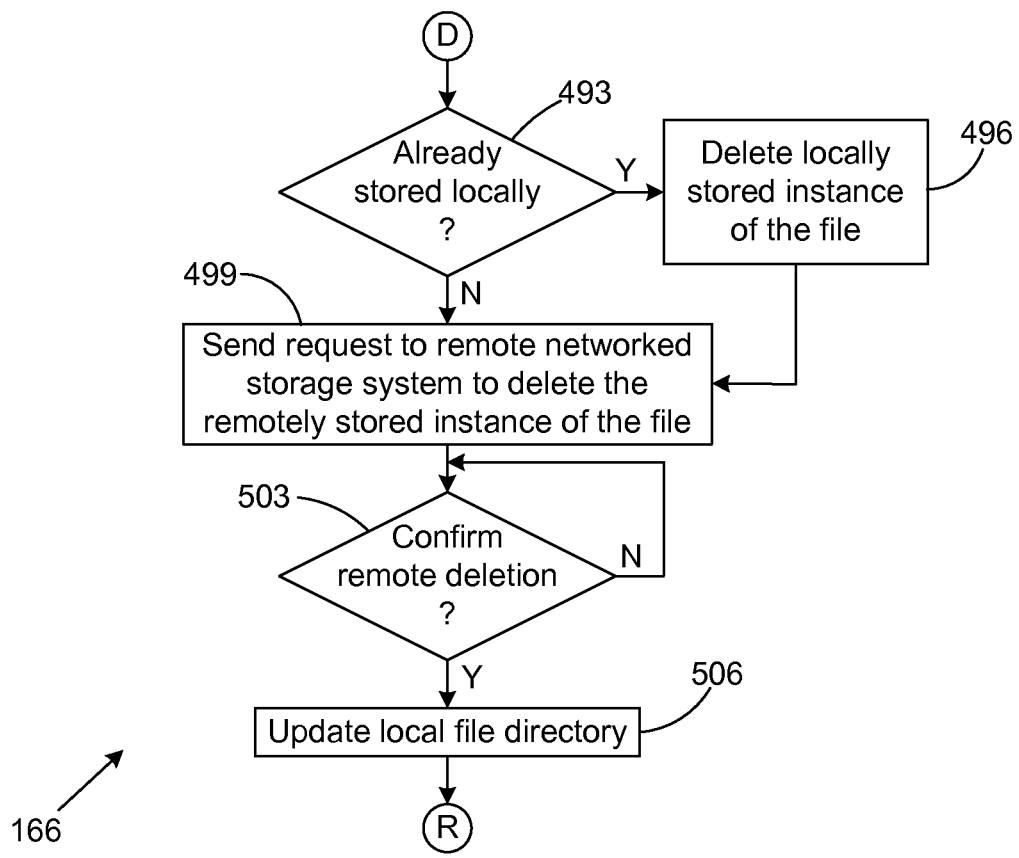

With reference then to FIG. 4D, shown is a portion of the functionality of the storage management application 166 in deleting a file as determined in box 419. Proceeding from connector D, the storage management application 166 progresses to box 493 to determine whether a file to be deleted is stored in the local memory 203 of the portable memory device 173. If so, then in box 496, the locally stored instance of the file is deleted from the memory 203. Thereafter, the storage management application 166 proceeds to box 499.

Assuming that it is determined that there is no local instance of a file stored in the memory 203 in box 493, then the storage management application 166 also progresses to box 499. In box 499, a request is sent to the networked storage system 116 to delete the remotely stored instance of a file from a respective storage bucket 153 associated with the storage account 133 of a user. Thereafter, in box 503, the storage management application 166 waits to receive confirmation of a deletion from the networked storage system 116. If such confirmation is not received within a predefined timeout period, then an error may result.

Assuming that confirmation is received as deemed appropriate, then the storage management application 166 proceeds to box 506 to update the local file directory 209 to remove the file from the directory in accordance with the deletion operation. Thereafter, the storage management application 166 progresses to connector R as shown.

Figure 5:
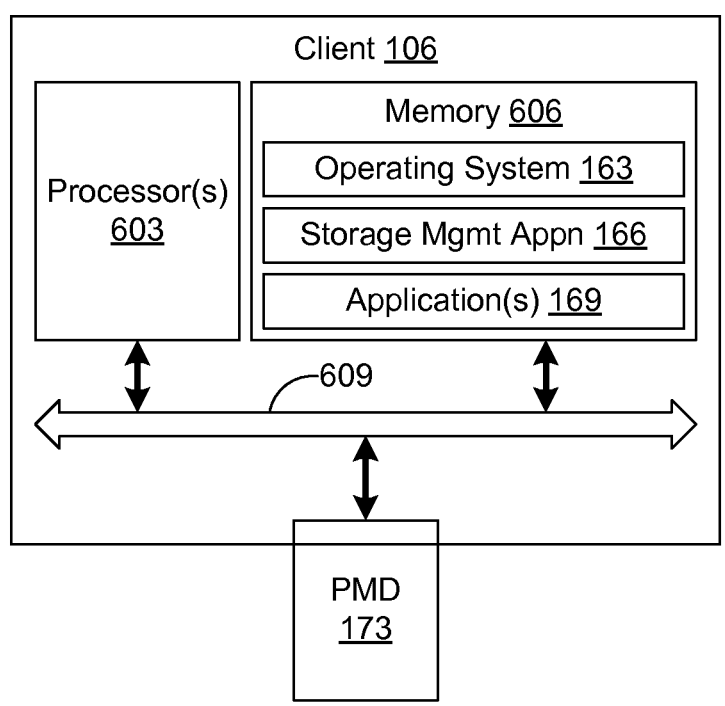
FIG. 5 is a schematic block diagram that provides one example illustration of a computing device employed in the networked environment of FIG. 1 according to various embodiments of the present disclosure.

With reference to FIG. 5, shown is a schematic block diagram of one example of a client computing device 106 according to an embodiment of the present disclosure. The client computing device 106 includes at least one processor circuit, for example, having a processor 603 and a memory 606, both of which are coupled to a local interface 609. To this end, the computing device 106 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the storage management application 166 and potentially other applications 169. In addition, an operating system 163 may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the storage management application 166 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 4A, 4B, 4C, and 4D show the functionality and operation of an implementation of portions of the storage management application 166. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 4A, 4B, 4C, and 4D show a specific order of execution, it is understood that the order of execution may differ from that which is depicted. For example, the order of execution of two or more blocks may be scrambled relative to the order shown. Also, two or more blocks shown in succession in FIGS. 4A, 4B, 4C, and 4D may be executed concurrently or with partial concurrence. Further, in some embodiments, one or more of the blocks shown in FIGS. 4A, 4B, 4C, and 4D may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the storage management application 166, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   initiating, via a computing device, storage of a plurality of files on a cache of a removable memory device coupled to the computing device as part of a storage of the plurality of files on a networked storage system, wherein the cache stores a finite set of files that has been most recently transferred to the networked storage system, wherein a size of the finite set of files corresponds to a size of memory space available for storing the finite set of files on the removable memory device;
   initiating, via the computing device, storage of the plurality of files in the networked storage system in response to determining that a network is available, the plurality of files stored in the networked storage system in association with an account linked to the removable memory device;
   generating, via the computing device, a local file directory listing of files stored by the networked storage system in association with the account and the removable memory device in the removable memory device, wherein the listing of files includes the plurality of files stored on the cache of the removable memory device, the listing of files further including a first file stored on the networked storage system;
   receiving, by the computing device, a request to delete the first file that is stored in the networked storage system;
   determining, by the computing device, that the first file is not stored on the removable memory device;
   sending, via the computing device, a request to the networked storage system to delete the first file from the networked storage system in response to determining that the first file is not stored on the removable memory device;
   receiving, by the computing device, a confirmation from the networked storage system that the first file has been deleted; and
   updating, by the computing device, the local file directory listing to indicate that the first file has been deleted.

2. The method of claim 1, further comprising:
   receiving, via the computing device, a request from an application executed on the computing device to read a second file;
   determining, via the computing device, that the second file is stored on the removable memory device; and
   providing, via the computing device, the second file to the application from the removable memory device.

3. The method of claim 2, further comprising determining, via the computing device, that a previous version of the second file is stored on the cache by the removable memory device.

4. The method of claim 3, further comprising determining, via the computing device, that the previous version of the second file that is stored on the cache by the removable memory device is obsolete, the previous version of the second file being obsolete when the previous version of the second file is different from the second file; and storing a new version of the second file in place of the previous version of the second file on the cache of the removable memory device.

5. The method of claim 3, further comprising updating, via the computing device, at least one parameter associated with the second file in response to determining that the previous version of the second file is not obsolete.

6. The method of claim 1, further comprising:
   receiving, via the computing device, a request from an application executed on the computing device to read a second file;
   determining, via the computing device, that the second file is not stored on the removable memory device in response to receiving the request from the application to read the second file;
   determining, via the computing device, that the second file is stored on the networked storage system in response to receiving the request from the application to read the second file;
   retrieving, via the computing device, the second file from the networked storage system over the network in response to determining that the second file is stored on the networked storage system and that the second file is not stored on the removable memory device; and
   providing, via the computing device, the second file to the application in response to receiving the second file from the networked storage system.

7. The method of claim 1, further comprising:
   receiving, via the computing device, a request from an application executed on the computing device to read a second file;
   determining, via the computing device, that the second file is not stored on the removable memory device;
   determining, via the computing device, that a connection to the network is unavailable; and
   providing, via the computing device, a reply to the application indicating that the second file is unavailable in response to determining that the second file is not stored on the removable memory device or that the connection to the network is unavailable.

8. The method of claim 1, further comprising generating, via the computing device, a user interface displaying a hierarchical representation of the plurality of files stored by the networked storage system and the removable memory device as being stored locally.

9. A system comprising:
   a removable memory device configured to couple to a computing device; and
   a storage management application stored in the removable memory device, the storage management application being executable by a processor circuit, the storage management application being configured to at least:
      initiate storage of a plurality of files on a cache of the removable memory device coupled to the computing device as part of a storage of the plurality of files on a networked storage system, wherein the cache stores a finite set of files that have been most recently transferred to the networked storage system, wherein a size of the finite set of files corresponds to a size of memory space available for storing the finite set of files on the removable memory device;

initiate storage of the plurality of files to a networked storage system in response to determining that a network is available, the plurality of files stored in the networked storage system based at least in part upon an account linked to the removable memory device;

generate a local file directory listing of files stored by the networked storage system and the removable memory device, wherein the listing of files includes the plurality of files stored on the cache of the removable memory device, the listing of files further including a first file stored on the networked storage system;

receive a request to delete the first file that is stored in the networked storage system;

determine that the first file is not stored on the removable memory device:

send a request to the networked storage system to delete the first file from the networked storage system in response to determining that the first file is not stored on the removable memory device;

receive a confirmation from the networked storage system that the first file has been deleted; and update the local file directory listing to indicate that the first file has been deleted.

10. The system of claim 9, wherein the storage management application is further configured to at least delete a previously accessed file stored on the removable memory device to make room for storing a second file on the removable memory device, wherein a date of last access for the previously accessed file is earlier than a corresponding date of last access for remaining ones of the finite set of files.

11. The system of claim 10, wherein the deleted previously accessed file is maintained in the local file directory of the removable memory device.

12. The system of claim 9, wherein the storage management application is further configured to at least initiate storage of the first file to the networked storage system based at least in part upon a storage bucket associated with the account linked to the removable memory device.

13. The system of claim 9, wherein the storage management application is further configured to at least:
receive a first request to delete a second file from the storage management application;
determine that the second file is stored on the removable memory device;
delete the second file from the cache of the removable memory device;
send a second request to delete the second file from the networked storage system;
receive a confirmation from the networked storage system that the second file has been deleted; and
update the local file directory listing to indicate that the second file has been deleted.

14. The system of claim 9, wherein the application only perceives the first file as being stored locally, regardless of whether the first file is stored on the removable memory device or on the networked storage system.

15. A method comprising:
initiating, by a computing device, storage of a plurality of files by a networked storage system by sending individual ones of the plurality of files to the networked storage system over a network, individual ones of the plurality of files stored in the networked storage system based at least in part upon an account associated with a user of a removable memory device;

using, by the computing device, the removable memory device for intermediate storage of a subset of the plurality of files stored on the networked storage system, wherein the subset of the plurality of files stored on the removable memory device are most recently transferred ones of the plurality of files stored on the networked storage system by the computing device;

generating, by the computing device, a local file directory listing of the plurality of files stored by the networked storage system and the removable memory device;

receiving, by the computing device, a request to delete a first file that is stored in the networked storage system;

determining, by the computing device, that the first file is not stored on the removable memory device;

sending, via the computing device, a request to the networked storage system to delete the first file from the networked storage system in response to determining that the first file is not stored on the removable memory device;

receive a confirmation from the networked storage system that the first file has been deleted; and update the local file directory listing to indicate that the first file has been deleted.

16. The method of claim 15, further comprising:
receiving, by the computing device, a request from an application executed on the computing device to store a second file on the removable memory device;
initiating, by the computing device, storage of the second file on the removable memory device in response to receiving the request to store the second file on the removable memory device;
sending, by the computing device, the second file to the networked storage system in response to determining that a network is available and receiving the request to store the second file on the removable memory device; and
updating, by the computing device, the local file directory listing to indicate that the second file has been stored to the removable memory device.

17. The method of claim 15, further comprising:
determining, by the computing device, whether a previous version of a respective one of the plurality of files that is stored on the removable memory device is obsolete, the previous version of the respective one of the plurality of files being obsolete when the previous version of the respective one of the plurality of files is different from the respective one of the plurality of files; and
updating, by the computing device, at least one parameter associated with the respective one of the plurality of files in response to determining that the previous version of the respective one of the plurality of files is not obsolete.

18. The method of claim 15, further comprising executing, by the computing device, an application that overrides at least one setting in an operating system executed in the computing device, wherein overriding the at least one setting causes the operating system to simulate a local storage of the plurality of files in the removable memory device while, at the same time, providing for an actual remote storage of the plurality of files in the networked storage system that is accessible to the computing device over the network.

19. The method of claim 15, further comprising:
- determining, by the computing device, that a requested one of the plurality of files is stored in the removable memory device in response to a read request from a process;
- obtaining, by the computing device, a copy of the requested one of the plurality of files from the networked storage system if the requested one of the plurality of files is not stored in the removable memory device and a connection to the network is available to the computing device; and
- providing, by the computing device, the copy of the requested one of the plurality of files to the process.

20. The method of claim 19, further comprising providing, by the computing device, a reply to the process that indicates that the requested one of the plurality of files is not available if the requested one of the plurality of files is not stored in the removable memory device and the connection to the network is not currently available to the computing device.

* * * * *

UNITED STATES PATENT AND TRADEMARK OFFICE
CERTIFICATE OF CORRECTION

PATENT NO. : 9,836,479 B2
APPLICATION NO. : 14/579213
DATED : December 5, 2017
INVENTOR(S) : Piragash Velummylum et al.

Page 1 of 1

It is certified that error appears in the above-identified patent and that said Letters Patent is hereby corrected as shown below:

In the Claims

Column 15, (Claim 9) Line 21, please delete ":" and replace with --;--

Signed and Sealed this
Eighth Day of May, 2018

Andrei Iancu
*Director of the United States Patent and Trademark Office*